United States Patent Office 3,403,182
Patented Sept. 24, 1968

3,403,182
TRICYCLO[3.3.2.0⁴,⁶]DECADIENE-2,7-ONE-10 AND PROCESS THEREFOR
Jan Nielsen and Cornelis Hoogzand, Brussels, Belgium, assignors to Union Carbide Corporation, a corporation of New York
No Drawing. Filed May 25, 1965, Ser. No. 458,774
2 Claims. (Cl. 260—586)

ABSTRACT OF THE DISCLOSURE

Tricyclo[3.3.2.0$^{4,6}$]decadiene-2,7-one-10 is prepared by contacting [N-methyl - N - (beta-N',N'-dimethylaminoethyl)]tricyclo[3.3.2.0$^{4,6}$]deca-2,7,9-triene with silica gel. The ketone is useful as a polar solvent which is liquid over a wide range of temperature.

---

This invention relates to polycyclic organic compounds. More particularly the invention is directed to tricyclo[3.3.2.0$^{4,6}$]decadiene-2,7-one-10, derivatives thereof and a process for producing the compound and derivatives.

The compound tricyclo[3.3.2.0$^{4,6}$]deca-2,7,9-triene and many of its derivatives are known and described in the literature.[1]

The structural formula for tricyclo[3.3.2.0$^{4,6}$]deca-2,7,9-triene, $C_{10}H_{10}$, is as follows:

(A) 

The structural formula for tricyclo[3.3.2.0$^{4,6}$]decadiene-2,7-one-10, $C_{10}H_{10}O$, is as follows:

(B) 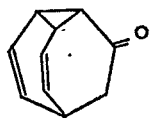

It has now been discovered that the ketone derivative of tricyclo[3.3.2.0$^{4,6}$]deca-2,7,9-triene exists and can be prepared by the process which comprises contacting a secondary-amino derivative of the compound of Formula A with silica gel. This is conveniently done by passing an organic solvent solution of the secondary-amino derivative of the compound of formula A through a column containing silica gel. A conventional column chromatography apparatus is satisfactory.

The alkylamino derivative of the compound of Formula A can in turn be prepared by the reaction of the mono-bromo derivative of the compound of Formula A with an alkali metal derivative of a secondary amine.

Derivatives of the compound of Formula B, for example the alkyl, aryl, alkenyl, alkoxy, alkoxyalkyl, and the like derivatives, can be prepared (conveniently starting with the corresponding mono-bromo derivatives of the compound of Formula A) from the corresponding secondary amino-derivatives of the compound of Formula A.

The compound of Formula B exists in equilibrium with the corresponding enol form represented by the formula

The equilibrium greatly favors the keto form of Formula B.

[1] G. Schroder, R. Merenyi and J. F. M. Oth, Tetrahedron Letters No. 14, 773, 1964.

The compound of Formula B and its derivatives are useful in a variety of applications. Many of these compounds, due to the presence of the keto-enol function and other functional substituents such as alkenyl and alkoxy, react readily with other compounds such as alcohols, amines, acids to form new and valuable products. Moreover, the olefinic bonds in some of the novel compositions can be epoxidized to give compounds which are useful as stabilizers for various resin systems. Additionally, many of the unsaturated polycyclic compounds are relatively reactive materials which homopolymerize or copolymerize readily with other reactive cyclic monomers to provide a useful class of polymeric compounds. These polymers can range from viscous liquids to extremely tough solids. The very viscous liquids of relatively low molecular weight, are useful in the preparation of polishes, and waxes, and as thickening agents for various lubricants. The polymers can be employed as protective coatings and impregnants. These polymers are also useful for the production of various shaped articles such as brush handles, bottoms, lamp bases, toys and the like.

The compound of Formula B is also useful as a polar solvent for chemical reactions, particularly where a polar solvent which is liquid over a wide range of temperature is desired.

The following detailed example further illustrates the present invention. 100 ml. of a 2 N solution of $CH_3Li$ in diethyl ether are slowly added with stirring to 25 ml. of

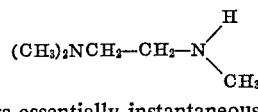

Reaction occurs essentially instantaneously to yield

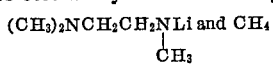

After reaction is complete the diethyl ether is evaporated in vacuo (16 mm./40° C.) leaving a viscous solution of

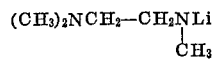

in

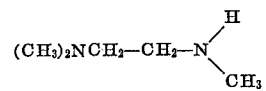

To this solution is added 5.0 g. of bromobullvalene[2] ($CH_{10}H_9Br$) dissolved in 50 ml. of

[2] G. Schroder, R. Merenyi and J. F. M. Oth, Tetrahedron Letters No. 14, 773 (1964).

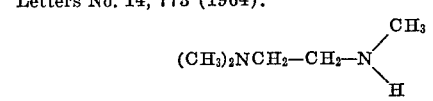

and the mixture stirred at 30° C. for 18 hours. To the resultant brown reaction product, 100 ml. of water are slowly added with stirring. The solution is then extracted with 50 ml. pentane. The pentane extract is removed and the extraction process repeated twice, each time using 50 ml. of pentane. The combined pentane extract fractions were dried overnight using 5 g. of $Na_2SO_4$. The pentane was then evaporated (40 mm./50° C.) and the residue oil, 4.84 g., distilled in a molecular still under a pressure of 0.01 mm. at 80° C. 4.2 g. of

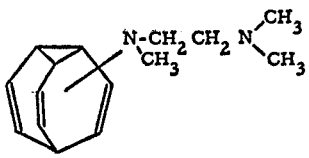

were obtained.

The above intermediate product is dissolved in 10 ml. of benzene and the solution passed over a column (50 cm. high, 25 cm. diameter) of silica gel at room temperature. Hydrolysis of the above intermediate product occurs during elution with additional benzene (500 ml.) yielding the product

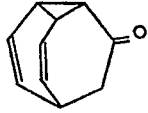

tricyclo[3.3.2.0$^{4,6}$]decadiene-2,7-one-10 in 66% yield (2.3 g.). Elemental analysis: C=82.31%, H=7.13%, O=11.24% found vs. C=82.15%, H=6.90%, O= 10.95% theoretical. M.P. 39–41° C. Infra-red and nuclear magnetic resonance studies confirmed the structure.

What is claimed is:

1. The keto-enol mixture of tricyclo[3.3.2.0$^{4,6}$]decadiene-2,7-one-10 and 10-hydroxytricyclo[3.3.2.0$^{4,6}$]deca-2,7,9-triene.

2. The process for producing the keto-enol mixture of tricyclo[3.3.2.0$^{4,6}$]decadiene-2,7-one-10 and 10-hydroxytricyclo[3.3.2.0$^{4,6}$]deca-2,7,9-triene which comprises contacting [N-methyl-N-(beta-N′,N′-dimethylaminoethyl)]tricyclo[3.3.2.0$^{4,6}$]deca-2,7,9-triene,

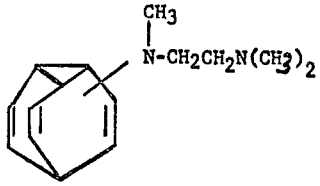

with silica gel.

References Cited

Raphael et al.: "Adv. in Org. Chem.," vol. 3, pp. 260–261 (1963).

Schroder: "Chem. Ber.," vol. 97(11), p. 3143 (1964).

BERNARD HELFIN, Primary Examiner.

M. JACOB, Assistant Examiner.